US006756185B2

(12) United States Patent
Steinberg

(10) Patent No.: US 6,756,185 B2
(45) Date of Patent: Jun. 29, 2004

(54) METHOD FOR MAKING INTEGRATED OPTICAL WAVEGUIDES AND MICROMACHINED FEATURES

(75) Inventor: Dan A. Steinberg, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 2 days.

(21) Appl. No.: 09/862,593

(22) Filed: May 23, 2001

(65) Prior Publication Data

US 2004/0029053 A9 Feb. 12, 2004

Related U.S. Application Data

(63) Continuation-in-part of application No. 09/858,999, filed on May 16, 2001, which is a continuation-in-part of application No. 09/853,250, filed on May 9, 2001.
(60) Provisional application No. 60/202,596, filed on May 9, 2000, provisional application No. 60/204,473, filed on May 16, 2000, provisional application No. 60/257,021, filed on Dec. 20, 2000, and provisional application No. 60/206,485, filed on May 23, 2000.

(51) Int. Cl.[7] .............................. G03F 7/00; G02B 6/00

(52) U.S. Cl. ......................... 430/321; 430/322; 216/25; 216/26; 65/385; 385/88

(58) Field of Search ............................... 430/321, 322; 216/25, 26; 65/385, 424; 385/129, 88, 147

(56) References Cited

U.S. PATENT DOCUMENTS

| 4,837,129 A | | 6/1989 | Frisch et al. |
| 5,001,038 A | | 3/1991 | Dorinski et al. |
| 5,213,916 A | | 5/1993 | Cronin et al. .................... 430/5 |
| 5,384,872 A | * | 1/1995 | Jacobs-Cook et al. ......... 385/31 |
| 5,547,788 A | | 8/1996 | Han et al. ........................ 430/5 |
| 5,631,109 A | | 5/1997 | Ito ................................... 430/5 |
| 5,784,509 A | * | 7/1998 | Yamane et al. ................ 385/49 |
| 5,961,683 A | * | 10/1999 | Mizuta et al. ................. 65/386 |
| 6,274,198 B1 | | 8/2001 | Dautartas ...................... 427/282 |
| 2002/0012885 A1 | | 1/2002 | Steinberg et al. ............... 430/5 |
| 2002/0031711 A1 | | 3/2002 | Steinberg et al. ............... 430/5 |

FOREIGN PATENT DOCUMENTS

EP 0453753 10/1991

* cited by examiner

Primary Examiner—Mark F. Huff
Assistant Examiner—Kripa Sagar
(74) Attorney, Agent, or Firm—Jonathan D. Baskin; Niels Haun

(57) ABSTRACT

The same mask pattern is used as an etching mask in defining the horizontal location of micro-machined (etched) features at the substrate surface of an optical device relative to the waveguide cores also at the substrate surface of the optical device. Exemplary micro-machined features include grooves, recesses and inclined surfaces formed in the substrate surface for any of a variety of purposes. The accurate horizontal positioning of these features relative to the integrated waveguide cores fosters accurate optical coupling between the integrated waveguide cores and external and/or internal components.

31 Claims, 15 Drawing Sheets

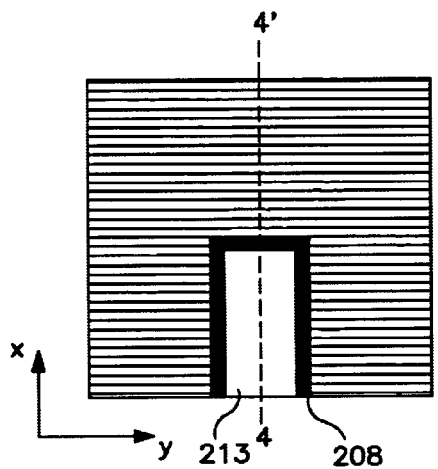
FIG. 2(g)
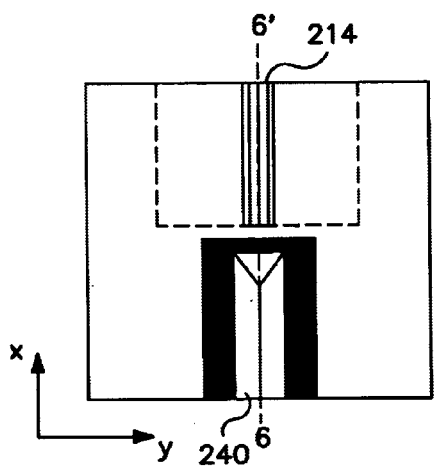
FIG. 2(h)
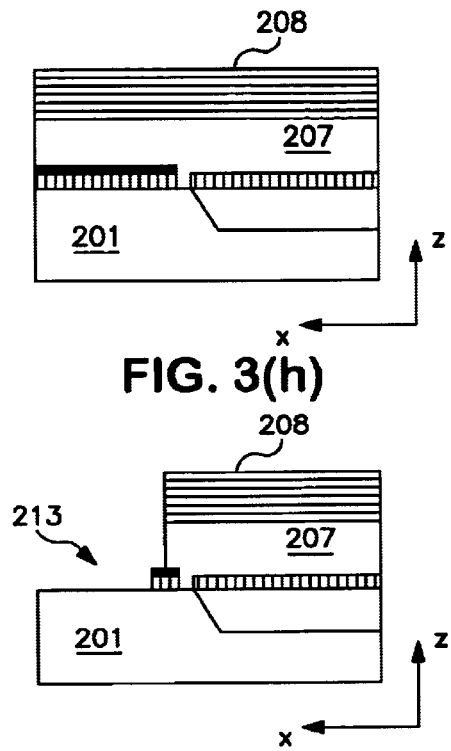
FIG. 3(h)
FIG. 3(i)
FIG. 3(j)
FIG. 3(k)

METHOD FOR MAKING INTEGRATED OPTICAL WAVEGUIDES AND MICROMACHINED FEATURES

CROSS-REFERENCE TO RELATED APPLICATIONS

Priority is claimed to U.S. Provisional Application Ser. No. 60/206,485, filed May 23, 2000, and entitled "Single Mask Method For Making IO Waveguides And Micromachined Features", the entirety of which is incorporated herein by reference.

In addition, this is a continuation-in-part (CIP) of co-pending application Ser. No. 09/858,999, filed May 16, 2001, and entitled "Multi-Level Optical Structure And Method of Manufacture", which in turn in a continuation-in-part (CIP) of co-pending application Ser. No. 09/853,250, filed May 9, 2001, and entitled "Multi-Level Lithography Masks", which in turn claims the benefit of the following U.S. Provisional Patent Applications: Ser. No. 60/202,596, entitled "Multilevel Contact Mask For Patterning Multilevel Substrates", filed May 9, 2000; Ser. No. 60/204,473, entitled "Single Mask Process for Patterning Integrated Optic Waveguides, Metallizations and Micromachined Features", filed May 16, 2000, and Ser. No. 60/257,021, entitled "Alternative Embodiment For Making The Multilevel Contact Mask", filed Dec. 20, 2000. The entireties of application Ser. Nos. 09/853,150 and 09/858,999 are incorporated herein by reference.

BACKGROUND OF THE INVENTION

1. Field of the Invention

The present invention generally relates to optical devices, and more particularly, the present invention relates to the fabrication of optical devices having integrated optical waveguides.

2. Description of the Related Art

Optical integrated circuit (OIC) and optical bench fabrication often involves transferring patterns to a substrate. These patterns may be used to form a variety of structures to include conductive circuit lines, planar waveguides, mesas and recesses. Typically, the desired structures are formed using lithography. Lithography may be achieved by techniques such as photolithography, x-ray lithography and e-beam lithography.

In photolithography, for example, a layer of photoreactive film, known as photoresist, may be formed over the substrate. A photolithographic mask containing the image of a desired pattern is then placed in contact with the photoresist film. Radiation of a wavelength to which the photoresist is sensitive is incident upon the mask. The radiation passes through the transparent areas of the mask and the exposed areas of the photoresist are reactive to the radiation. The photoresist film is then chemically developed, leaving behind a pattern of photoresist substantially identical to the pattern on the mask.

The patterned photoresist on the substrate may be used in a variety of applications to form the structures referenced above. For example, a pattern photoresist may act as a mask for selective etching of a substrate. This selective etching may be used to fabricate recesses and as mesas in the substrate. In OIC and optical bench technologies, the mesas and recesses may be used for a variety of purposes, including passive alignment of optical elements.

The above described photolithographic process is often referred to as contact printing, because the mask is placed in contact with the substrate. Contact printing has facilitated the fabrication of highly integrated structures in both electrical and optical integrated circuits. However, conventional contact printing techniques have certain limitations. For example, conventional contact printing techniques generally are useful only in processing flat substrates. If a substrate has a relief (i.e. has a non-planar topography) it is exceedingly difficult to fabricate structures on the substrate by flat conventional contact printing techniques. To this end, conventional photolithographic masks are substantially flat. As a result, it is exceedingly difficult to place the mask in contact with, or in close enough proximity to, all points on the surface of a substrate to enable accurate image projection onto the substrate. In regions of the substrate where the photolithographic mask is not in contact with, or in close enough proximity to, the substrate, diffractive effects result in poor resolution and ultimately a poor transfer of the pattern from the mask to the photoresist.

The above referenced limitations of image lithography processing typically result in inaccurate location and spacing of features in a multi-level substrate. These inaccuracies are unacceptable as the integration of various elements at multiple levels in OIC's and optical bench technologies gains industry acceptance. Accordingly, what is needed are optical integrated circuits and optical benches which incorporate a variety of features at multiple levels which overcome the inaccuracies of conventional structures and methods of manufacture as referenced above.

SUMMARY OF THE INVENTION

According to an aspect of the present invention, an optical device is fabricated having at least one integrated waveguide and at least one micro-machined feature. Although not so limited, exemplary micro-machined features include grooves, recesses and inclined surfaces formed in the substrate surface. A mask layer is deposited over a surface of a substrate structure, and the mask layer is patterned to obtain a mask pattern over the surface of the substrate structure. A first etching process is then carried out for obtaining the at least one integrated optical waveguide core at the surface of the substrate structure, and a second etching process is carried out for obtaining the at least one micro-machined feature at the surface of the substrate structure. Advantageously, the same previously formed mask pattern is used as a mask in both the first and second etching processes, thereby resulting in accurate positioning of the waveguide core relative to the micro-machined feature.

BRIEF DESCRIPTION OF THE DRAWINGS

The invention is best understood from the following detailed description when read with the accompanying drawings. It is emphasized that the various features are not necessarily drawn to scale. In fact, the dimensions may be arbitrarily increased or decreased for clarity of discussion.

Figures 1A, 1B, 1C, 1D:
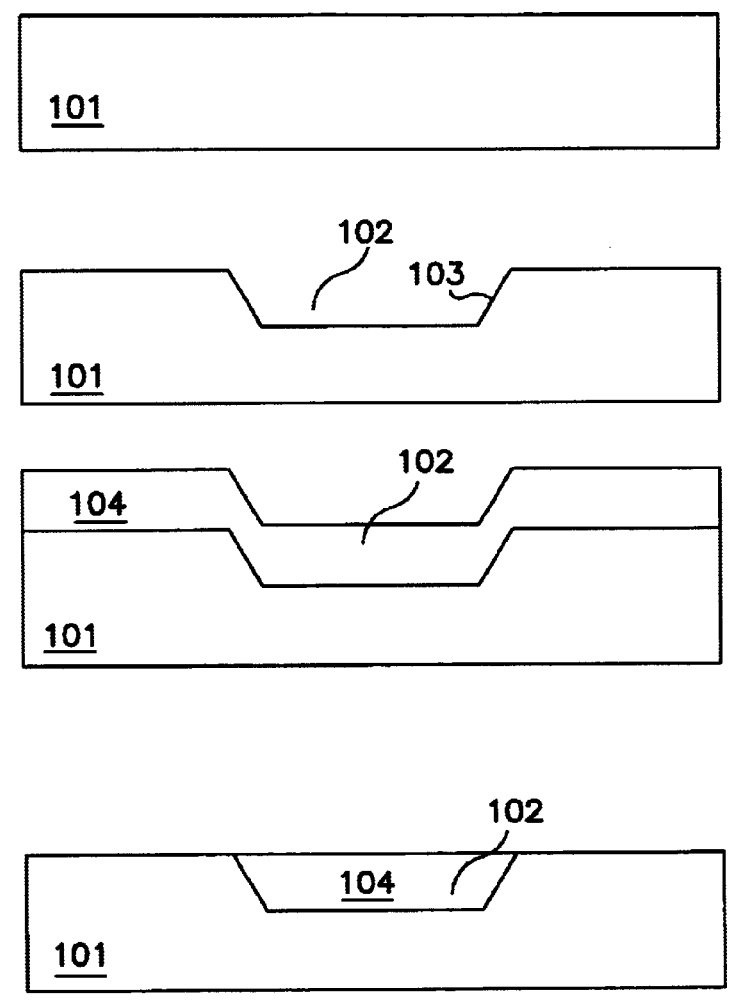

FIGS. 1(a) through 1(m) are side views for describing a method of fabricating an optical device according to an embodiment of the present invention.

FIGS. 2(a) through 2(i) are top views for describing a method of fabricating an optical device according to another embodiment of the present invention.

FIGS. 3(a) through 3(m) are side views for describing a method of fabricating an optical device according to the embodiment of FIGS. 2(a) through 2(i).

DETAILED DESCRIPTION OF THE PREFERRED EMBODIMENTS

Figure 1E:
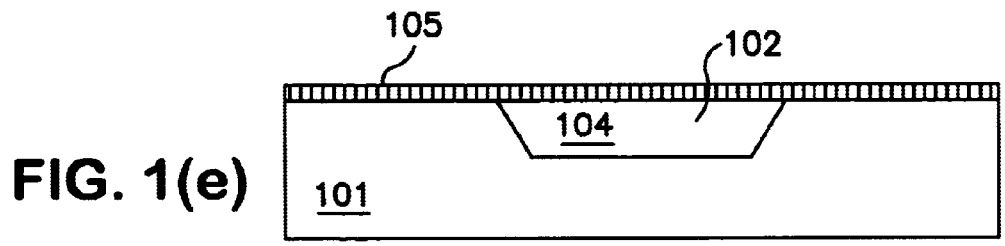

In the following detailed description, for purposes of explanation and not limitation, exemplary embodiments disclosing specific details are set forth in order to provide a thorough understanding of the present invention. However, it will be apparent to one having ordinary skill in the art having the benefit of the present disclosure, that the present invention may be practiced in other embodiments that depart from the specific details disclosed herein. Moreover, descriptions of well-known devices, methods and materials may be omitted so as to not obscure the description of the present invention.

As will become apparent below, the present invention is at least partially characterized by the use of the same, preferably planar, mask pattern as an etching mask in defining the horizontal location of micro-machined (etched) features at the substrate surface of an optical device relative to the waveguide cores also at the substrate surface of the optical device. Although not so limited, exemplary micro-machined features include grooves, recesses and inclined surfaces formed in the substrate surface for any of a variety of purposes. For example, grooves may be machined (etched) into the substrate surface for holding optical fibers which are to be optically coupled to the integrated waveguide cores. Also, recesses may be formed for holding spherical elements which function as guide balls in an optical switch device. Likewise, inclined substrate surfaces may fabricated as alignment surfaces for accurate mounting of the optical device into a system. The accurate horizontal positioning of these features relative to the integrated waveguide cores fosters accurate optical coupling between the integrated waveguide cores and external and/or internal components.

An illustrative embodiment of a method of fabricating an optical device according to the present invention will now be described with reference to FIGS. 1(a) through 1(m) of the drawings. Throughout these figures, like elements are designated by the same reference numbers.

FIG. 1(a) generally depicts a substrate 101. In this embodiment, the substrate 101 is a silicon substrate. However, any of a variety of substrate structures may be adopted, including silicon-on-insulator (SOI) substrates.

Using known masking and etching techniques, a pit 102 is etched in the substrate 101 as shown in FIG. 1(b). The pit 102 is optionally formed so as to define inclined sidewalls 103. Then, as shown in FIG. 1(c), a cladding material layer 104 is deposited over the surface of the substrate 101 and within the pit 102. In this embodiment, the cladding material layer 104 is formed of silicon dioxide ($SiO_2$), although other materials may be readily adopted.

The structure of FIG. 1(c) is then planarized to obtain the structure shown in FIG. 1(d). Here, the cladding layer material 104 is contained with the pit 102, and the remaining surface of the substrate 101 is exposed.

Turning to FIG. 1(e), a core material layer 105 is deposited over the surface of the structure of FIG. 1(d) so as to cover the exposed surface of the substrate 101 and the surface of the cladding material layer 104 contained within the pit 102. In this embodiment, the core material layer 105 is formed of silica. However, other materials may be used, such as silicon and silicon nitride.

Figure 1F:
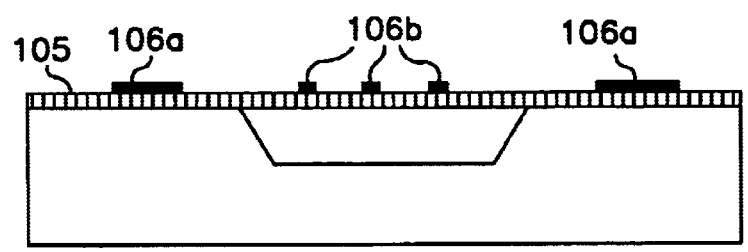

A mask layer 106a/106b is then deposited and patterned over the core material layer 105. In particular, as shown in FIG. 1(f), the patterned mask layer includes portions 106a which define etched features and portions 106b which define waveguides. The patterned mask layer may be formed of a metal such as chromium (Cr). Other materials may be used, however, such as aluminum, titanium, copper, gold, nickel, metal silicides, silicon nitride, and other etch resistant materials.

Figure 1G:
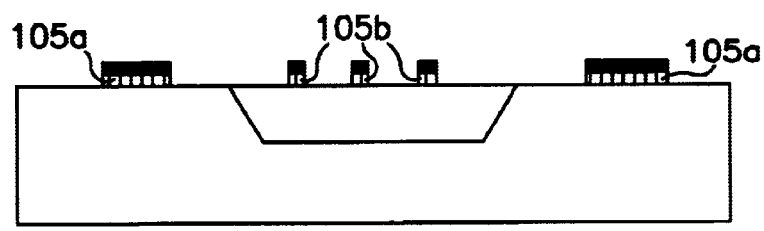
Figure 1H:
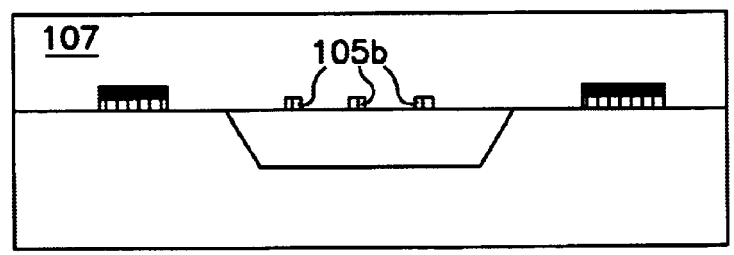

Exposed portions of the core material layer 105 are then removed by reactive ion etching (RIE) as illustrated in FIG. 1(g). As a result, the remaining core material layer is defined by etched feature portions 105a and waveguide portions 105b. The mask layer portions 106b (FIG. 1(f)) are then removed from the respective tops of the waveguide portions 105b, and another cladding material layer 107 is deposited over a resultant structure as shown in FIG. 1(h). Again, the cladding material layer 107 may, for example, be formed of $SiO_2$ or other materials.

Figure 1I:
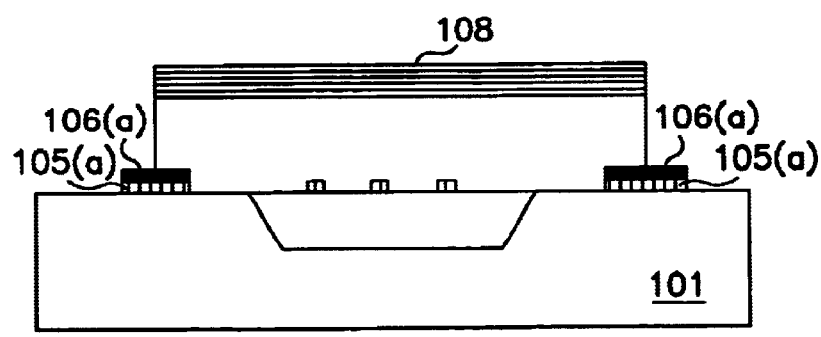

Turning to FIG. 1(i), a mask 108 is deposited over the cladding material layer 107 so as to cover the waveguide portions 105b and partially overlap the mask layer portions 106a and underlying etched feature portions 105a. Another etch process (e.g., wet etching or RIE) is then performed down to the silicon substrate to obtain the structure illustrated in FIG. 1(i). As shown, the mask layer portions 106a and underlying etched feature portions 105a remain on the surface of the silicon substrate 101.

Figure 1J:
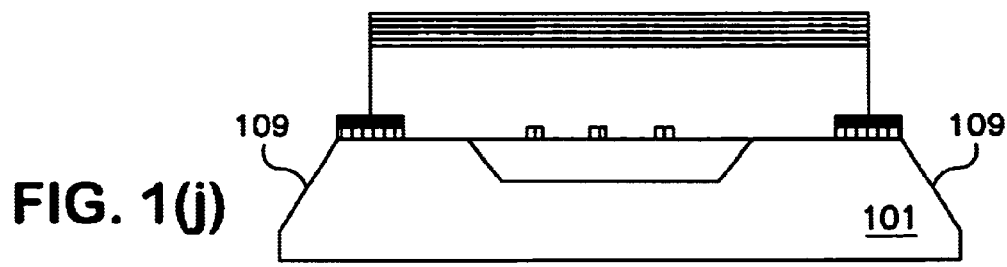

The structure of FIG. 1(i) is then subjected to a wet etch to obtain the structure of FIG. 1(j) in which inclined surface features 109 are formed at opposite sides of the silicon substrate 101. Note that the inclined surface features 109 redefined here by the same mask pattern that was previously used to define the waveguide portions 105a of the core material layer. Also note that the inclined surface features 109 may actually define half of a V-shaped groove in the case where another device is being simultaneously formed in the substrate 101 adjacent to the device Illustrated in the drawings.

Figure 1K:
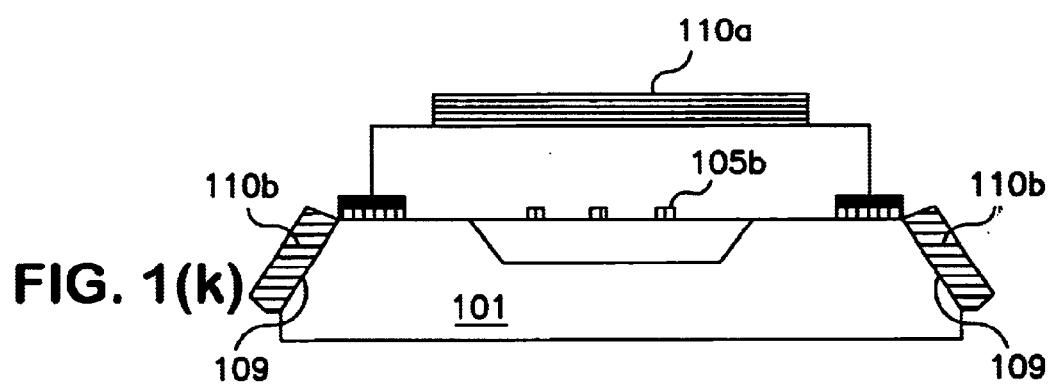
Figure 1L:
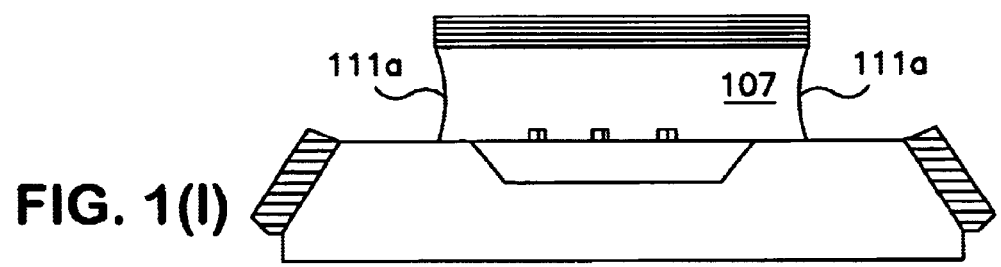
Figure 1M:
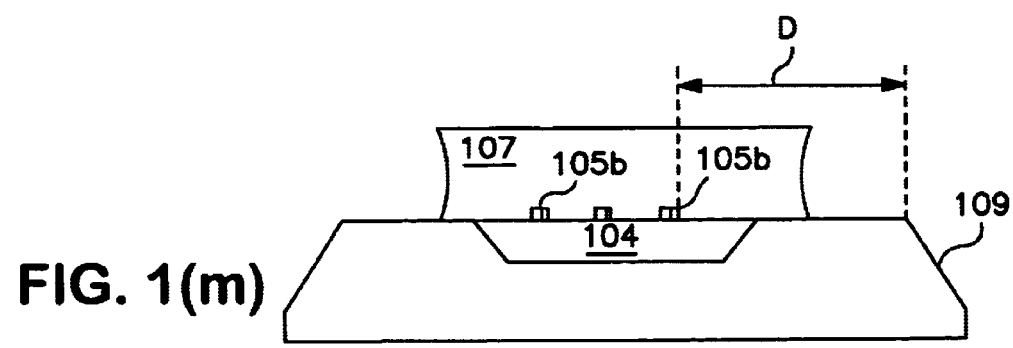

Another mask is applied as shown in FIG. 1(k). In particular, the mask includes a portion 110a which covers the waveguide portions 105b of the core layer, and portions 110b which cover the inclined surfaces 109 of the substrate 101. This structure is then etched in hydroflouric acid (HF) to obtain the structure shown in FIG. 1(l). As shown, the side surfaces 111a of the upper cladding layer 107 may exhibit a slight concave configuration. The mask portions 110a and 110b are then removed to obtain the device structure of FIG. 1(m) having the waveguide cores 105b sandwiched between lower and upper cladding layers 104 and 107, respectively.

In the process described above, the distance D of FIG. 1(m) is a horizontal distance between the waveguide core 105a and the inclined surface feature 109. Since the same mask pattern 106a/106b is used to etch both the waveguide 105a and the feature 109, this distance D may be precisely set, and the device characteristics and alignment tolerances are thereby improved.

Another illustrative embodiment of the present invention will now be described with reference to the top views of FIGS. 2(a) through 2(i) and the side views of FIGS. 3(a) through 3(m). Throughout these figures, like elements are designated by the same reference numbers. In this embodiment, a generally V-shaped groove (micro-machined feature) is aligned with an integrated optical waveguide core(s).

Figure 2A:
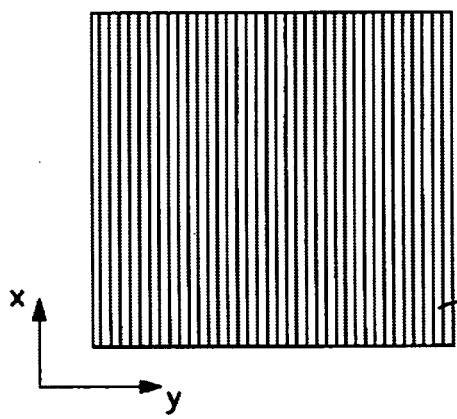
Figure 3A:
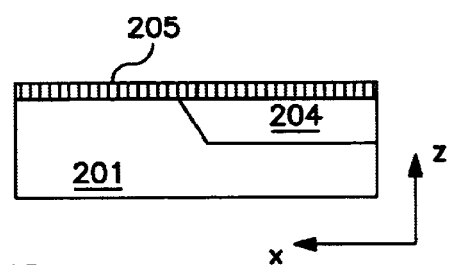
Figure 2B:
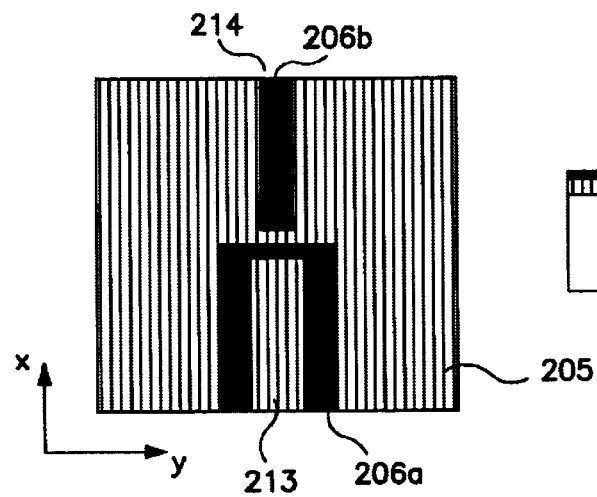
Figure 3B:
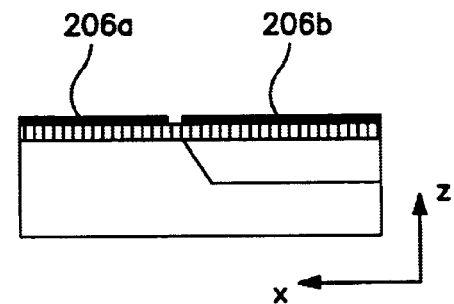

FIGS. 2(a) and 3(a) illustrate a structure which is similar to that obtained in FIG. 1(e) described above. That is, in FIGS. 2(a) and 3(a), reference number 201 denotes a substrate, reference number 204 denotes a lower cladding material layer, and reference number 205 denotes a core material layer. A mask layer is deposited over the cladding material layer 205 as shown in FIGS. 2(b) and 3(b). The mask layer includes a first portion 206a which surrounds and thereby defines a groove region 213, and a second portion 206b which covers and thereby defines a waveguide region 214. As shown, the waveguide region 214 and the groove region 213 are aligned with one another along their respective lengths. Also, for simplicity the drawings depict a continuous second mask portion 206b. However, the mask portion 206b can actually comprise a number of parallel masks for defined a corresponding number of parallel waveguide cores within the waveguide region 214.

Figure 2C:
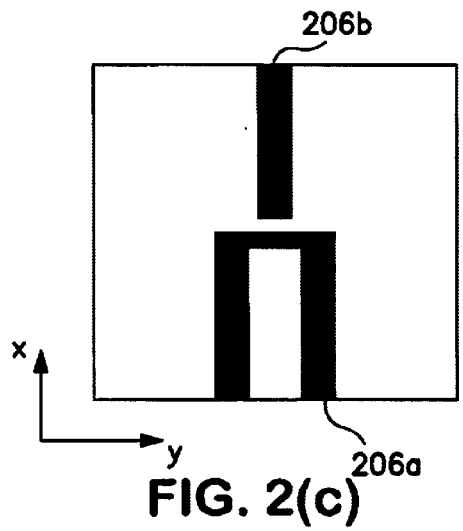
Figure 3C:
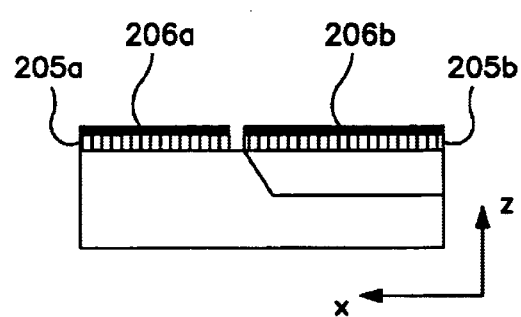

Turning to FIGS. 2(c) and 3(c), the exposed portions of the core material layer 205 are removed by RIE using the first and second mask portions 206a and 206b as a mask. As a result, a portion 205a of the core material layer remains below the first mask portion 206a, and another portion 205b of the core material layer remains below the second mask 206b. Then, referring to FIGS. 2(d) and 3(d), the portion 206b of the mask layer is removed from atop the portion 205b of the core material layer within the waveguide region 214.

Figure 2D:
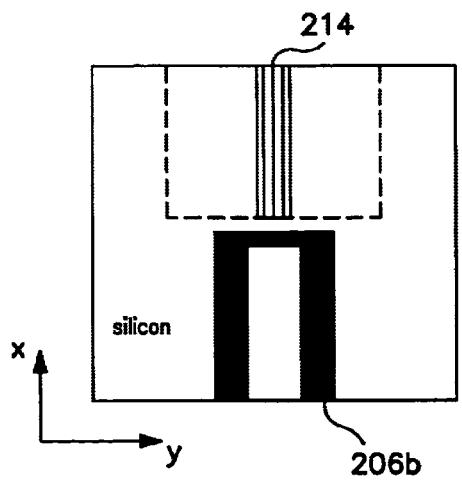
Figure 3D:
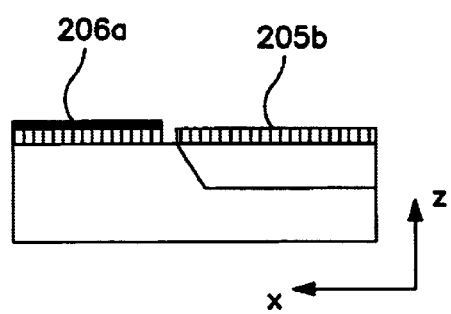
Figure 2E:
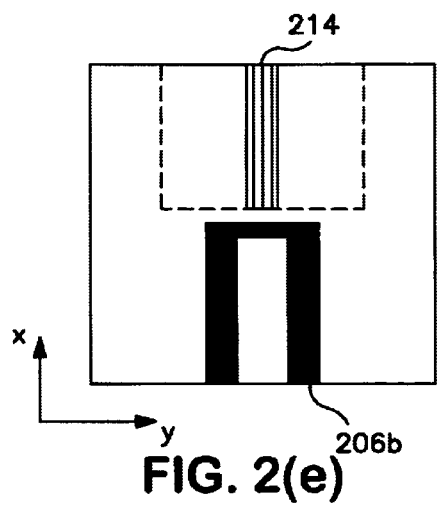
Figure 2F:
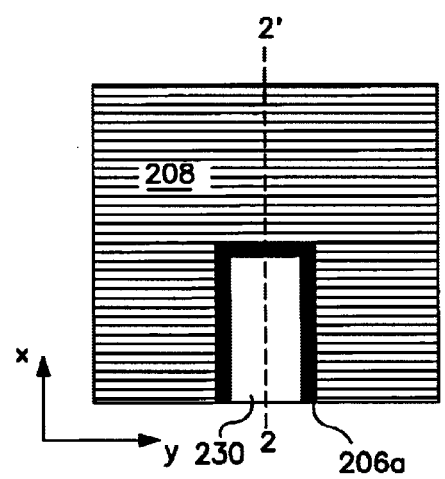
Figure 3E:
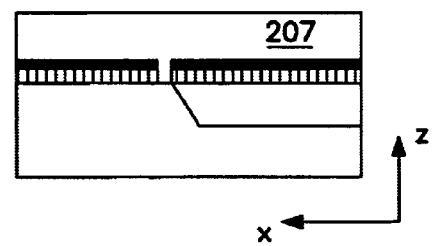
Figure 3F:
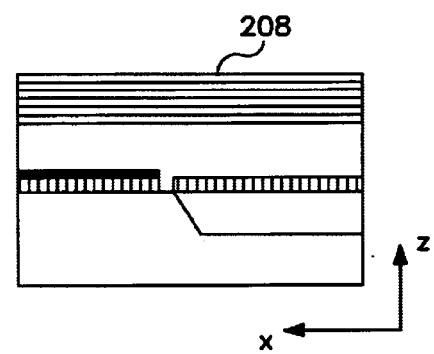
Figure 3G:
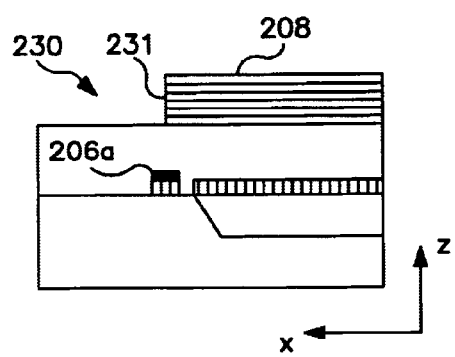

An upper cladding material layer is then deposited over the entire surface of the structure shown in FIGS. 2(d) and 3(d). The resultant configuration is depicted in FIGS. 2(e) and 3(e) in which reference number 207 denotes the upper cladding material layer. Then, as shown in FIGS. 2(f), 3(f) and 3(g), a mask 208 is deposited over the upper cladding material layer 207 such that edges 231 of an opening 230 thereof are aligned with the portion 206a. Here, FIG. 3(f) is a side view of FIG. 2(f), and FIG. 3(g) is a cross-sectional view of FIG. 2(f) along line 2–2'.

Exposed portions of the upper cladding material layer 207 are then removed by RIE using the mask 208 as a mask, whereby the surface of the substrate 201 within the groove region 213 becomes exposed. The resultant configuration is shown in FIGS. 2(g), 3(h) and 3(i). FIG. 3(h) is a side view of FIG. 2(g), and FIG. 3(i) is a cross-sectional view of FIG. 2(g) along line 4–4'.

The configuration of FIGS. 2(g), 3(h) and 3(i) is then subjected to a wet etching process using the mask 208 as a mask, to thereby form a groove 240 in the exposed surface portion of the substrate 201. Note that the groove 240 is defined here by the same mask pattern what was previously used to defined the waveguide portions 205a of the core material layer. The mask 208 is then removed, and the resultant configuration is illustrated in FIGS. 2(h), 3(j) and 3(k), where FIG. 3(j) is a side view of FIG. 2(h), and FIG. 3(k) is a cross-sectional view of FIG. 2(h) along line 6–6'. As shown in these figures, the groove 240 extends lengthwise in alignment with the waveguide region 214.

Figure 2I:
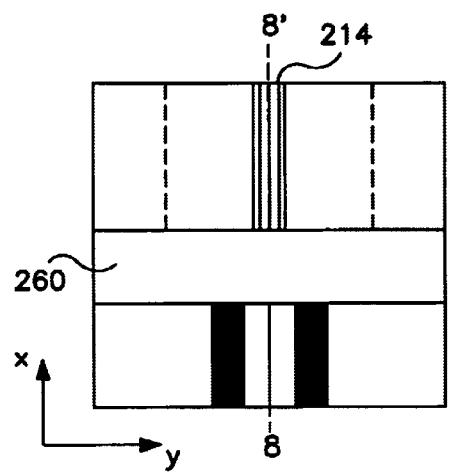
Figure 3L:
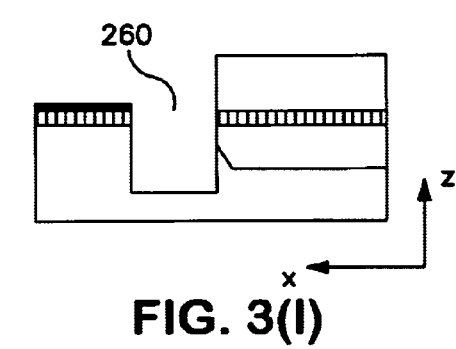
Figure 3M:
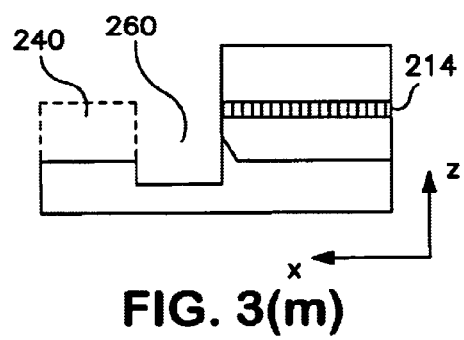

The groove 240 and the waveguide region 214 are then precisely spaced apart by cutting transversely therebetween into the substrate 201 with a dicing blade. The resultant configuration is shown in FIGS. 2(i), 3(l) and 3(m), where FIG. 3(l) is a side view of FIG. 2(i), and FIG. 3(m) is a cross-sectional view of FIG. 2(i) along line 8–8'. Here, reference number 260 denotes the dicing saw cut. In this device, the waveguide region 214 and the groove 240 (i.e., "feature") are precisely aligned since the same mask pattern was used in the fabrication of each.

Figure 4:
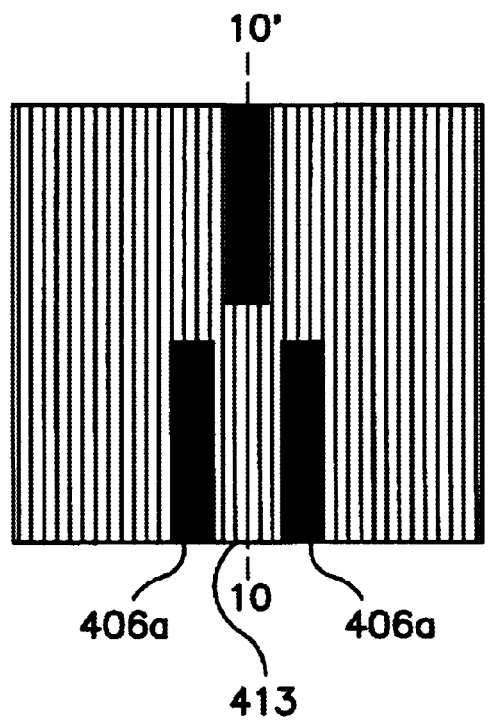
FIG. 4 is a top view for describing a variation of the embodiment of FIGS. 2(a) through 2(i).
Figure 5A:
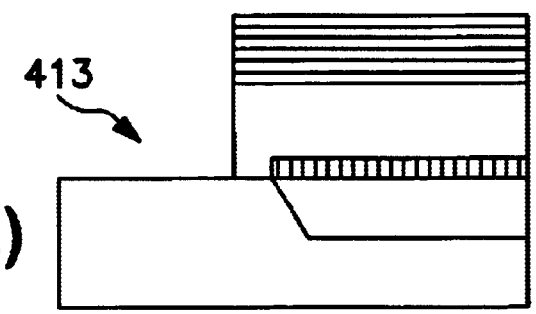
FIGS. 5(a) and 5(b) are side views corresponding to the variation of FIG. 4.
Figure 5B:
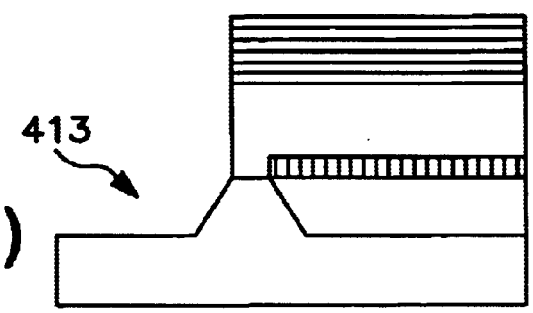

A modification of the previous embodiment is shown in FIGS. 4, 5(a) and 5(b), where FIG. 5(a) is a cross-sectional view of FIG. 4 along line 10–10' after the RIE process, and FIG. 5(b) is a cross-sectional view of FIG. 4 along line 10–10' after the wet etch process. Here, the first mask portion 406a extends in two parallel strips on either side of the groove region 413. This is contrasted with the configuration of the previous embodiment in which the first mask portion surrounds the groove region on three sides. Otherwise, the process is carried out in the same manner as the previous embodiment.

Figure 6:
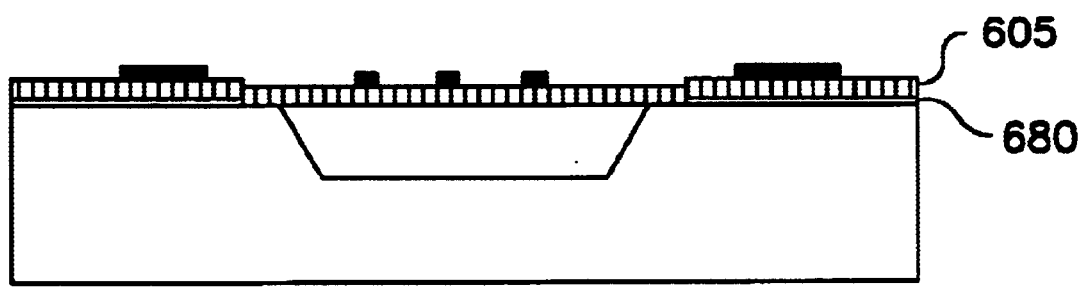
FIG. 6 is a side view of another embodiment of the present invention.

FIG. 6 illustrates an alternative process in which a layer of silicon nitride 680 is disposed under the core material layer in a vicinity of the machined features. Silicon nitride exhibits superior masking properties (compared to $SiO_2$) for anisotropic wet etching of the silicon substrate 601.

Another embodiment of the present invention will now be described with reference to FIGS. 7(a) through (e). In this embodiment, the core material layer is not etched to define the micro-machined features until after the waveguides are defined.

Figure 7A:
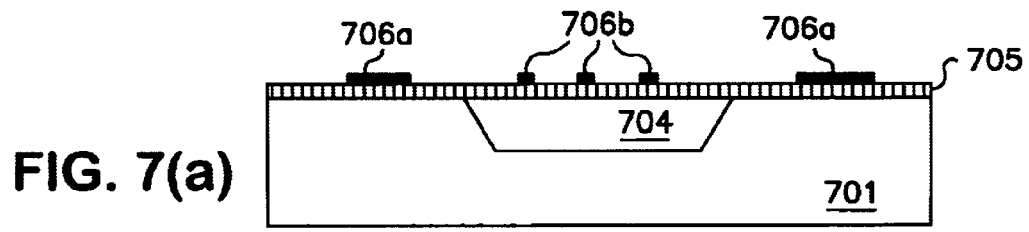
FIGS. 7(a) through 7(e) are side views for describing a method of fabricating an optical device according to another embodiment of the present invention.

FIG. 7(a) illustrates a structure similar to that described above in connection with FIG. 1(f). In particular, a lower cladding layer 704 is contained with a pit 702 formed in the surface of a substrate 701. A core material layer 705 extends over the surface of the substrate 701 and the lower cladding layer 704, and a mask pattern is formed over the core material layer 705. The mask pattern includes etched feature portions 706a and waveguide portions 706b.

Figure 7B:
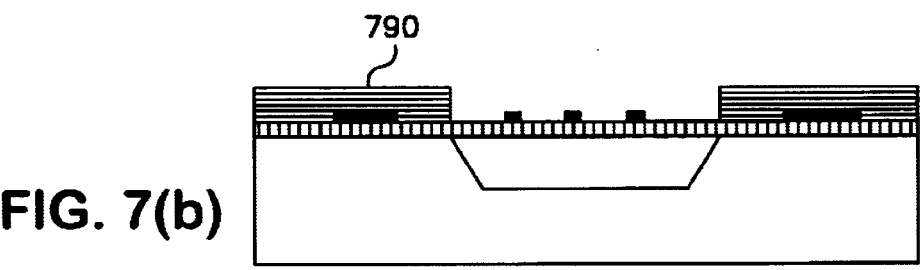
Figure 7C:
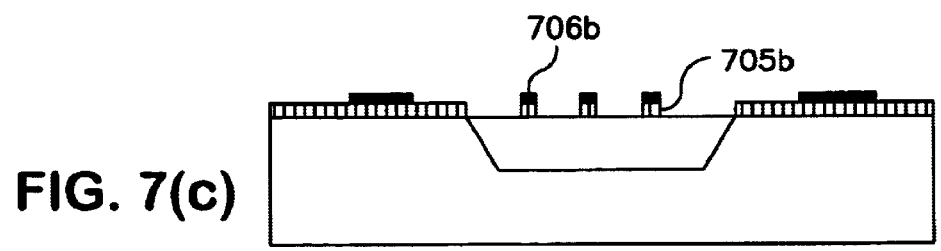

Turning to FIG. 7(b), a mask 790 is formed over the core material layer 705 and the mask pattern 706a so as to have an opening aligned with the lower cladding layer 704. The exposed portions of the core material layer 705 are then removed by RIE and the mask 790 is removed to obtain the structure depicted in FIG. 7(c). Here, reference number 705b denotes the waveguide portions of the core material layer remaining after etching.

Figure 7D:
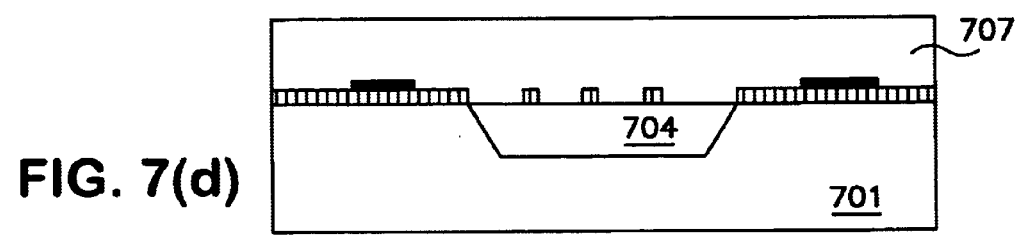
Figure 7E:
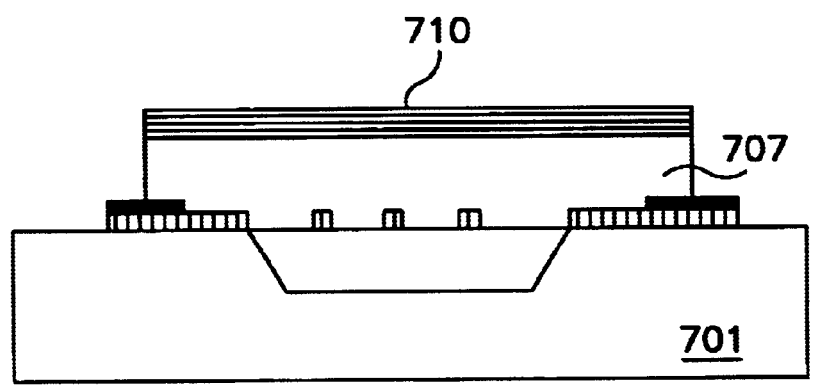

The portions 706b of the first mask are then removed, and an upper cladding layer 707 is deposited as shown In FIG. 7(d). A mask 710 is applied over the upper cladding layer 707 as shown in FIG. 7(e) and this structure is then subjected to at etch process (e.g., wet etching or RIE) to remove portions of the upper cladding layer 707 not covered by the mask 710 to thereby define the machined features as shown in FIG. 7(e). The process then proceeds as in the first described embodiment (see FIG. 1(i)). One advantage of the present embodiment is that the machined features can be more accurate since the core layer defining the machined features is etched only once.

Yet another illustrative embodiment of the present invention will now be described with reference to FIGS. 8(a) through 8(l) of the drawings.

Figure 8A:
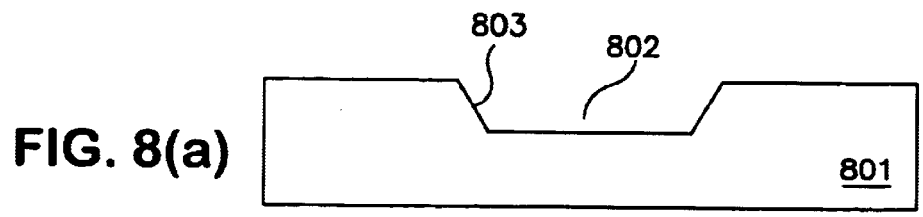
FIGS. 8(a) through 8(l) are side views for describing a method of fabricating an optical device according to another embodiment of the present invention.

Using known masking and etching techniques, a pit 802 is etched in a substrate 801 as shown in FIG. 8(a). In this embodiment, the substrate 801 is a silicon substrate. As before, however, any of a variety of substrate structures may be adopted, including silicon-on-insulator (SOI) substrates. The pit 802 is optionally formed so as to define inclined sidewalls 803.

Figure 8B:
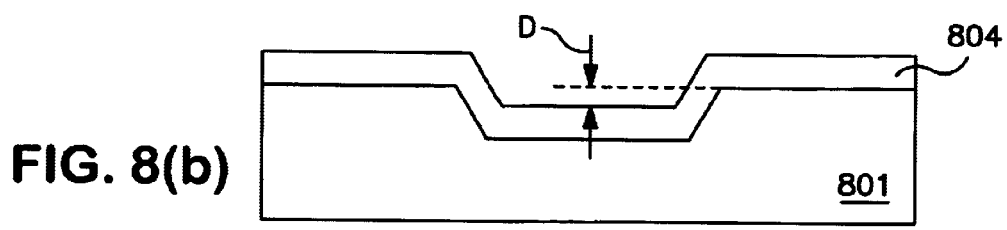

Then, as shown in FIG. 8(b), a cladding material layer 804 is deposited over the surface of the substrate 801 and within the pit 802. In this embodiment, the cladding material layer 804 is formed of silicon dioxide ($SiO_2$), although other materials may be adopted. Deposition of the cladding material layer 804 is halted prior to completely filling the pit 802, such that an upper surface of cladding material layer 804 is a displaced a distance "D" below a level of an upper surface of the substrate 801.

Figure 8C:
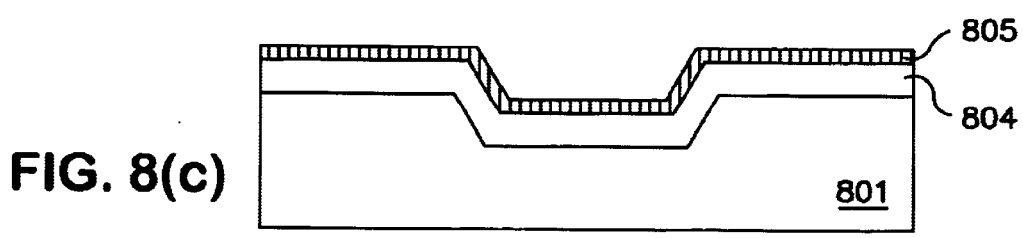

Turning to FIG. 8(c), a core material layer 805 is deposited over the surface of the cladding material layer 804. In this embodiment, the core material layer 805 is formed of silica. However, other materials may be used, including but not limited to silicon and silicon nitride. The structure of FIG. 8(c) is then planarized to obtain the structure of FIG. 8(d). As shown, both the core material layer 805 and the cladding layer material 804 are contained within the pit 802, and the remaining surface of the substrate 801 is exposed.

Figure 8D:
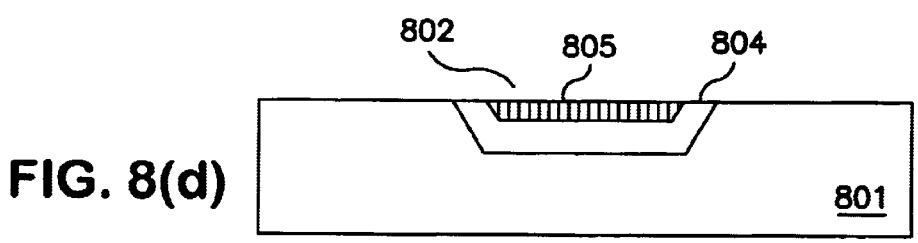
Figure 8E:
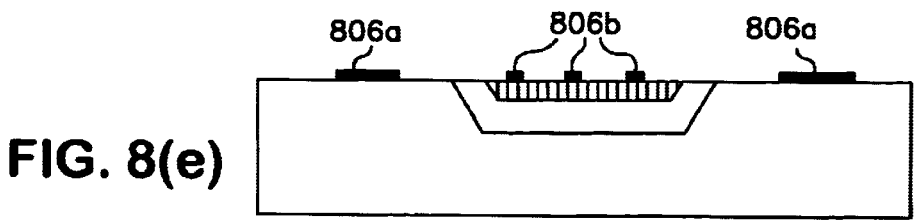

A mask layer is then deposited and patterned over the surface of the structure shown in FIG. 8(d). In particular, as shown in FIG. 8(e), the patterned mask layer includes portions 806a which define etched features and portions 806b which define waveguides. The patterned mask layer 806a/806b may be formed of a metal such as chromium (Cr). Other materials may be used, however, such as aluminum, titanium, copper, gold, nickel, metal silicides, silicon nitride, and other etch resistant materials.

Figure 8F:
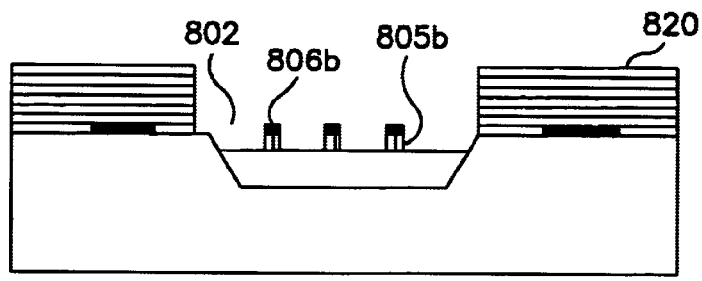
Figure 8G:
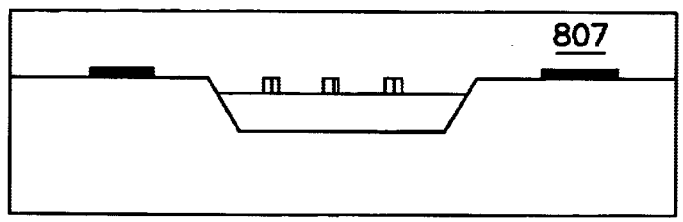

A mask 820 is then deposited with an opening that exposes the pit 802, and portions of the core material layer 805 are then removed by RIE as illustrated in FIG. 8(f). As a result, the remaining core material layer is defined by the waveguide portions 805b. The mask layer portions 806b are then removed from the respective tops of the waveguide portions 805b, and another cladding material layer 807 is deposited over a resultant structure as shown in FIG. 8(g). Again, the cladding material layer 807 may, for example, be formed of $SiO_2$.

Figure 8H:
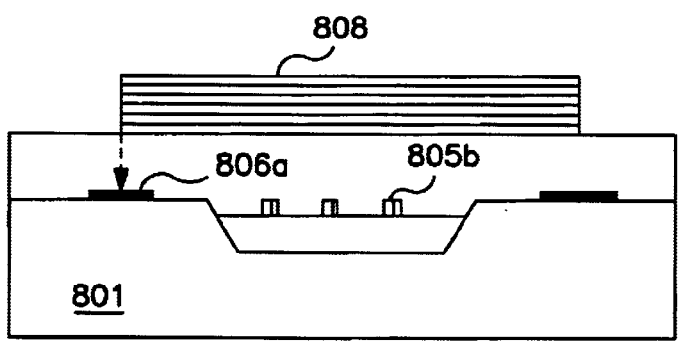

Turning to FIG. 8(h), a mask 808 is deposited over the cladding material layer 807 so as to cover the waveguide portions 805b and partially overlap the mask layer portions 806a. Another etch process (e.g., wet etching or RIE) is then performed down to the silicon substrate 801 to obtain the structure illustrated in FIG. 8(i). As shown, the mask layer portions 806a remain on the surface of the silicon substrate 801.

Figure 8I:
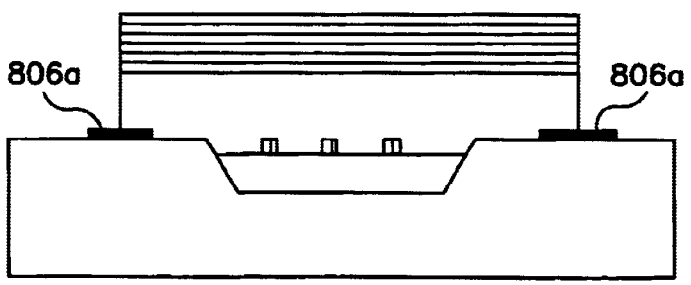
Figure 8J:
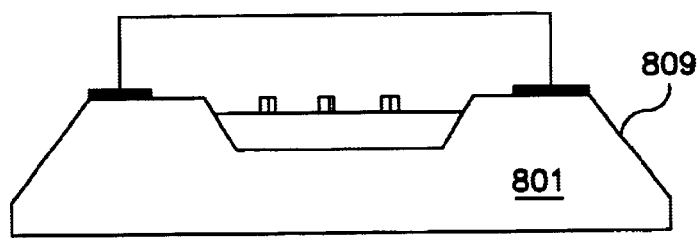

The structure of FIG. 8(i) is then subjected to a wet etch to obtain the structure of FIG. 8(j) in which inclined surface portions 809 are formed at opposite sides of the silicon substrate 801. It is noted that the inclined surface portions 809 may actually define half of a V-shaped groove in the case where another device is being simultaneously formed in the substrate 801 adjacent to the device illustrated in the drawings.

Figure 8K:
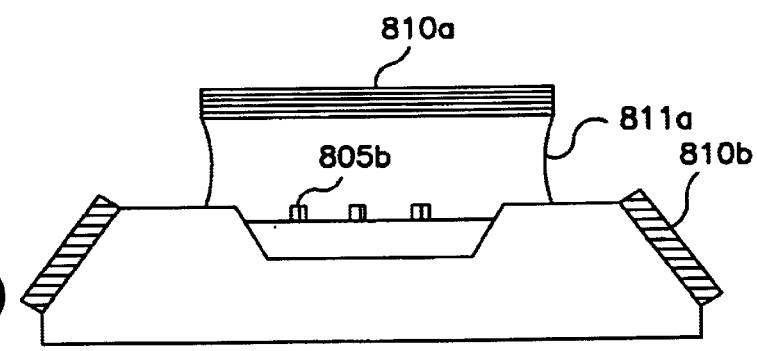
Figure 8L:
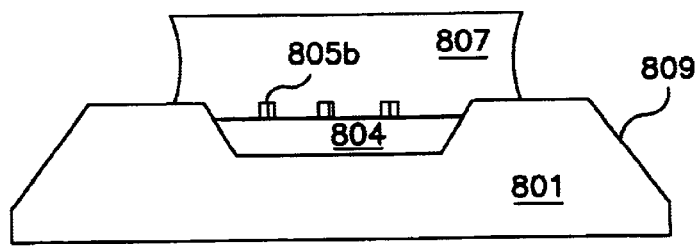

Another mask is applied as shown in FIG. 8(k). In particular, the mask includes a portion 810a which covers the waveguide portions 805b of the core layer, and portions 810b which cover the inclined surface features 809 of the substrate 801. This structure is then etched in HF to obtain the structure shown in FIG. 8(k). As shown, the side surfaces 811a of the upper cladding layer 807 may exhibit a slight concave configuration. The mask portions 810a and 810b are then removed to obtain the device structure of FIG. 8(l) having the waveguides 805b sandwiched between lower and upper cladding layers 804 and 807, respectively.

As with the previous embodiments, the horizontal distance between the waveguide cores 805a and the inclined surface feature 809 is precisely set since the same mask pattern 806a/806b is used to etch both the waveguide 805a and the feature 809, and the device characteristics and alignment tolerances ire thereby improved.

While the invention has been described in detail with respect to a number of exemplary embodiments, it is clear that various modifications of the invention will become apparent to those having ordinary skill in art having had benefit of the present disclosure. Such modifications and variations are included in the scope of the appended claims.

What is claimed is:

1. A method of fabricating an optical device having at least one integrated waveguide and at least one micromachined feature, comprising:

depositing a first mask layer over a surface of a substrate structure, and patterning the first mask layer to obtain a mask pattern over the surface of the substrate structure;

conducting a first etching process for obtaining the at least one integrated optical waveguide core at the surface of the substrate structure;

depositing a second mask layer over the at least one integrated optical waveguide core, the second mask layer having an end that is aligned with and at least partially overlaps a portion of the first mask layer; and conducting a second etching process for obtaining the at least one micro-machined feature at the surface of the substrate structure, wherein the first mask pattern is used as a mask in both the first and second etching processes.

2. The method as claimed in claim 1, wherein the mask layer is planar.

3. The method as claimed in claim 1, wherein the at least one micro-machined feature is an inclined surface etched into the surface of the substrate structure.

4. The method as claimed in claim 1, wherein the at least one micro-machined feature is a groove etched into the surface of the substrate structure.

5. The method as claimed in claim 1, wherein the mask layer is a metal.

6. A method of fabricating an optical device, comprising:

forming a lower cladding material layer within a recess of a substrate;

forming a core material layer over the lower cladding material layer and a surface of the substrate;

patterning a first mask layer over the core material layer, wherein the first mask layer is patterned such that a first portion extends over the lower cladding material layer, and such that a second portion extends over the surface of the substrate adjacent to the lower cladding material layer;

etching away the core material layer using the first mask layer as a mask such that a first core material portion remains below the first portion of the first mask layer and a second core material portion remain below the second portion of the first mask layer;

removing the first portion of the first mask layer to obtain a resultant structure and depositing an upper cladding material layer so as to cover a surface of the resultant structure;

patterning a second mask layer over the upper cladding material layer, wherein the second mask layer extends across the lower cladding material layer and has an end which is aligned with and at least partially overlaps the second portion of the first mask layer;

etching away the upper cladding material layer using the second mask layer as a mask to expose a part of the second portion of the first mask layer; and etching away portions of the substrate using the exposed part of the second portion of the first mask layer as a mask.

7. The method as claimed in claim 6, wherein the first mask layer is planar.

8. The method as claimed in claim 6, wherein the first mask layer is formed of a metal.

9. The method as claimed in claim 6, further comprising depositing a silicon nitride layer on the surface of the substrate prior to forming the core material layer over the lower cladding material layer and the surface of the substrate.

10. The method as claimed in claim 6, wherein the portions of substrate are etched away to define an inclined surface feature in the substrate.

11. The method as claimed in claim 10, further comprising:
patterning a third mask layer having a first portion which covers the inclined surface feature of the substrate and a second portion which extends over the upper cladding material layer; and
etching away the second portions of the first mask layer, the second portions of the core material layer, and exposed portions of the upper cladding material layer using the third mask layer as a mask.

12. A method of fabricating an optical device, comprising:
forming a lower cladding material layer within a recess of a substrate;
forming a core material layer over the lower cladding material layer and a surface of the substrate;
patterning a first mask layer over the core material layer, wherein the first mask layer is patterned such that a first portion extends lengthwise over the lower cladding material layer, and such that a second portion extends over the substrate surface adjacent to the lower cladding material layer and defines an elongate opening which is aligned in a lengthwise direction with the first portion of the first mask layer;
etching away the core material layer using the first mask layer as a mask such that a first core material portion remains below the first portion of the first mask layer and a second core material portion remains below the second portion of the first mask layer;
removing the first portion of the first mask layer to obtain a resultant structure and depositing an upper cladding material layer so as to cover a surface of the resultant structure;
patterning a second mask layer over the upper cladding material layer, wherein the second mask layer extends across the lower cladding material layer and has an end which is aligned with and at least partially overlaps the second portion of the first mask layer;
etching away the upper cladding material layer using the second mask layer as a mask to expose a part of the second portion of the first mask layer; and
etching away portions of the substrate using the exposed part of the second portion of the first mask layer as a mask.

13. The method as claimed in claim 12, wherein the first mask layer is planar.

14. The method as claimed in claim 12, wherein the first mask layer is formed of a metal.

15. The method as claimed in claim 12, further comprising depositing a silicon nitride layer on the surface of the substrate prior to forming the core material layer over the lower cladding material layer and the surface of the substrate.

16. The method as claimed in claim 12, wherein the portions of substrate are etched away to define an grooved surface feature in the substrate.

17. The method as claimed in claim 12, wherein the second portion of the first mask layer is defined by two parallel mask parts extending on opposite sides of the elongate opening.

18. The method as claimed in claim 17, wherein the second portion of the first mask layer is further defined by a third mask part which extends between ends of the two parallel mask parts.

19. A method of fabricating an optical device, comprising:
forming a lower cladding material layer within a recess of a substrate;
forming a core material layer ever the lower cladding material layer and a surface of the substrate;
patterning a first mask layer over the core material layer, wherein the first mask layer is patterned such that a first portion extends over the lower cladding material layer, and such that a second portion extends over the substrate surface adjacent to the lower cladding material layer;
patterning a second mask layer having an opening aligned over the lower cladding material layer;
etching away the core material layer wing the second mask layer and the first portion of the first mask layer as masks, wherein a first portion of the first core material layer remains below the first portion of the first mask layer, and a second portion of the first mask layer remains below the second mask layer;
removing the second mask layer and the first portion of the first mask layer to obtain a resultant structure and depositing an upper cladding layer so as to cover a surface of the resultant structure;
patterning a third mask layer over the upper cladding material layer, wherein the third mask layer extends across the lower cladding material layer and has an end which is aligned with and at least partially overlaps the second portion of the first mask layer;
etching away the upper cladding material layer using the third mask layer as a mask to expose a part of the second portion of the first mask layer; and
etching away portions of the substrate using the exposed part of the second portion of the first mask layer as a mask.

20. The method as claimed in claim 19, wherein the first mask layer is planar.

21. The method as claimed in claim 19, wherein the first mask layer is formed of a metal.

22. The method as claimed in claim 19, further comprising depositing a silicon nitride layer on a surface of the substrate prior to forming the core material layer over the lower cladding material layer and the exposed surface of the substrate.

23. The method as claimed in claim 19, wherein the portions of substrate are etched away to define an inclined surface feature in the substrate.

24. The method as claimed in claim 23, further comprising:
patterning a fourth mask layer having a first portion which covers the inclined surface feature of the substrate and a second portion which extends over the upper cladding material layer; and
etching away the second portions of the first mask layer, the second portions of the core material layer, and exposed portions of the upper cladding material layer using the fourth mask layer as a mask.

25. A method of fabricating an optical device, comprising:

forming a lower cladding material layer within a recess of a substrate such that an upper surface of the lower cladding material layer is below a surface of the substrate;

forming a core material layer within the recess and over the lower cladding material layer;

patterning a first mask layer over the core material layer and a surface of the substrate, wherein the first mask layer is patterned such that a first portion extends over the core material layer, and such that a second portion extends over the surface of the substrate surface adjacent to the core material layer;

etching away the core material layer using the first portion of the first mask layer as a mask such that a first core material portion remains below the first portion of the first mask layer;

removing the first portion of the first mask layer to obtain a resultant structure and depositing an upper cladding material layer sass to cover a surface of the resultant structure;

patterning a second mask layer over the upper cladding material layer, wherein the second mask layer extends across the core material layer and has an end which is aligned with and at least partially overlaps the second portion of the first mask layer;

etching away the upper cladding material layer using the second mask layer as a mask to expose a part of the second portion of the first mask layer; and etching away portions of the substrate using the exposed part of the second portion of the first mask layer as a mask.

26. The method as claimed in claim 25, wherein the first mask layer is planar.

27. The method as claimed in claim 25, wherein the first mask layer is formed of a metal.

28. The method as claimed in claim 25, further comprising depositing a silicon nitride layer on the surface of the substrate prior to forming the core material layer over the lower cladding material layer and the surface of the substrate.

29. The method as claimed in claim 25, wherein the portions of substrate are etched away to define an inclined surface feature in the substrate.

30. The method as claimed in claim 29, further comprising:

patterning a third mask layer having a first portion which covers the inclined surface feature of the substrate and a second portion which extends over the upper cladding material layer; and etching away the second portions of the first mask layer, the second portions of the core material layer, and exposed portions of the upper cladding material layer using the third mask layer as a mask.

31. The method as claimed in claim 6, wherein the etched away portions of the substrate form a V-shaped groove.

* * * * *